United States Patent
Girard

(10) Patent No.: US 12,290,857 B2
(45) Date of Patent: May 6, 2025

(54) SYSTEMS AND METHODS FOR REMOVING A SUPPORT STRUCTURE IN SUBTRACTIVE MACHINING

(71) Applicant: HEXAGON TECHNOLOGY CENTER GMBH, Heerbrugg (CH)

(72) Inventor: Clément Girard, Grenoble (FR)

(73) Assignee: Hexagon Technology Center Gmbh, Heerbrugg (CH)

(*) Notice: Subject to any disclaimer, the term of this patent is extended or adjusted under 35 U.S.C. 154(b) by 517 days.

(21) Appl. No.: 17/591,285

(22) Filed: Feb. 2, 2022

(65) Prior Publication Data

US 2022/0250155 A1 Aug. 11, 2022

Related U.S. Application Data

(60) Provisional application No. 63/146,476, filed on Feb. 5, 2021.

(51) Int. Cl.
| | |
|---|---|
| *B33Y 50/00* | (2015.01) |
| *B22F 10/66* | (2021.01) |
| *B22F 10/80* | (2021.01) |
| *B33Y 40/20* | (2020.01) |
| *G05B 19/4069* | (2006.01) |
| *B33Y 30/00* | (2015.01) |

(52) U.S. Cl.
CPC .............. *B22F 10/80* (2021.01); *B22F 10/66* (2021.01); *B33Y 40/20* (2020.01); *B33Y 50/00* (2014.12); *G05B 19/4069* (2013.01); *B33Y 30/00* (2014.12); *G05B 2219/34295* (2013.01); *G05B 2219/35313* (2013.01)

(58) Field of Classification Search
CPC .......... B22F 10/80; B22F 10/66; B33Y 40/20; B33Y 50/00; B33Y 30/00; G05B 19/4069; G05B 2219/34295
USPC ........................................................ 700/174
See application file for complete search history.

(56) References Cited

U.S. PATENT DOCUMENTS 9,688,024 B2 * 6/2017 Stava ..................... B22F 10/50
9,844,917 B2 * 12/2017 Burhop ................... B29C 64/40
(Continued)

OTHER PUBLICATIONS

Becker P et al: "Automation of Post-Processing in Additive Manufacturing with Industrial Robots", 2020 IEEE 16th International Conference of Automation Science and Engineering (CASE), IEEE, Aug. 20, 2020, pp. 1578-1583, XP033837350, DOI: 10.1109/CASE48305.2020.9216955.

*Primary Examiner* — Jigneshkumar C Patel
(74) *Attorney, Agent, or Firm* — Command IP LLP; Pejman Yedidsion

(57) ABSTRACT

Systems and methods including an additive component; a subtractive component; and a processor configured to: receive a contact line associated with a support structure from the additive component; receive geometry associated with an orientation from the additive component; receive data associated with a tool from the subtractive component; generate a subtractive tool path based on the received contact line, the received data associated with the tool, and the received geometry; transmit the generated subtractive tool path to the analysis component for processing tool path validation; and validate, by the analysis component, the tool path based on output from a simulation component to determine whether removal of the support structure from a part is successfully computed by the subtractive component.

16 Claims, 18 Drawing Sheets

(56) References Cited

U.S. PATENT DOCUMENTS

| | | | |
|---|---|---|---|
| 2019/0204807 A1 | 7/2019 | Nelaturi et al. | |
| 2020/0064809 A1* | 2/2020 | Sanders | G06F 30/17 |
| 2020/0265122 A1* | 8/2020 | Razzell | B22F 10/66 |
| 2021/0146623 A1* | 5/2021 | Babu | G05B 19/4099 |
| 2021/0256580 A1* | 8/2021 | Norman | G06F 30/12 |
| 2021/0341899 A1* | 11/2021 | Garvey | G05B 19/4183 |

* cited by examiner

SYSTEMS AND METHODS FOR REMOVING A SUPPORT STRUCTURE IN SUBTRACTIVE MACHINING

CROSS-REFERENCE TO RELATED APPLICATIONS

This application claims priority to and the benefit of U.S. Provisional Patent Application No. 63/146,476, filed Feb. 5, 2021, the contents of which are hereby incorporated by reference herein for all purposes.

TECHNICAL FIELD

Embodiments relate generally to subtractive manufacturing, and more particularly, to removing support structures from a region of a part.

SUMMARY

A system embodiment may include: an additive component; a subtractive component; and a processor and addressable memory, the processor configured to: receive a contact line associated with a support structure from the additive component; receive geometry associated with an orientation from the additive component; receive data associated with a tool from the subtractive component; generate a subtractive tool path based on the received contact line, the received data associated with the tool, and the received geometry; transmit the generated subtractive tool path to the analysis component for processing tool path validation; and validate, by the analysis component, the tool path based on output from a simulation component to determine whether removal of the support structure from a part may be successfully computed by the subtractive component.

In additional system embodiments, the additive component may comprise an additive manufacturing application and an additive kernel. In additional system embodiments, the orientation may comprise at least one of: data regarding a finished surface, removal accessibility of the support structure, deformation risk of the supported part, priority holes and priority surfaces, and support marks marking where the support structure contacts the supported part. In additional system embodiments, the contact line may specify a set of points of contact between the support structure and the part.

In additional system embodiments, the subtractive manufacturing application may be executed on a CNC machine. In additional system embodiments, the support structure may be removed by cutting along a contact line between the support structure and the part.

In additional system embodiments, the validation of the tool path may be further based on accessibility of the contact line for cutting by the tool. In additional system embodiments, the validation of the tool path may be further based on collision avoidance of the tool while moving along the tool path.

A method embodiment may include: receiving, by a subtractive component, a contact line associated with a support structure from an additive component from an additive kernel; receiving, by the subtractive component, geometry associated with orientation from the additive component; generating, by the subtractive component, data associated with a tool; determining, by the subtractive component, a subtractive tool path based on the received contact line, the received geometry, and the generated tool path; transmitting, by the subtractive component, the determined subtractive tool path to an analysis component for processing tool path validation; and validating, by the analysis component, the tool path based on an output from a simulation component to determine whether removal of the support structure from a part may be successfully computed by the subtractive component.

In additional method embodiments, the contact line may be based on a region to support and a support structure, where the support structure information may be based on support parameters and the region to support may be based on geometry received from an additive component. In additional method embodiments, the orientation may be further based on output from the analysis component. In additional method embodiments, the support parameters may be based on output from the analysis component.

In additional method embodiments, the support structure may be removed by cutting along a contact line between the support structure and the part. In additional method embodiments, the validation of the tool path may be further based on accessibility of the contact line for cutting by the tool. In additional method embodiments, the validation of the tool path may be further based on collision avoidance of the tool while moving along the tool path.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
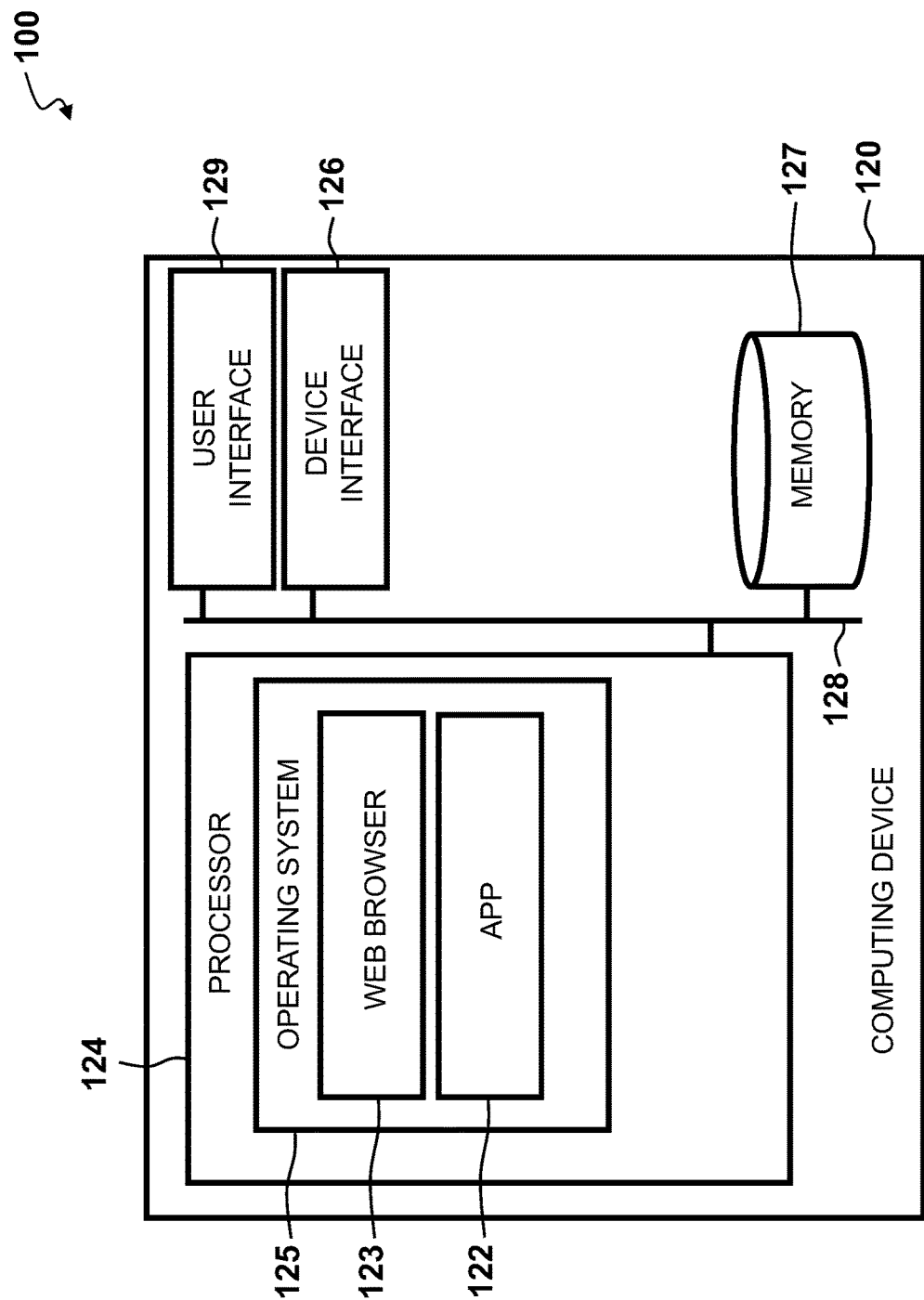
FIG. 1 depicts a top-level functional block diagram of a computing device system in a computer aided manufacturing (CAM) environment.

Additive manufacturing (AM), also known as 3D printing, is considered the construction of a three-dimensional object from a Computer-aided design (CAD) model or a digital 3D model. Additive Manufacturing refers to a variety of manufacturing processes where a part is built by adding material to a smaller base. Subtractive manufacturing (SM), on the other hand, may involve removing material from a larger stock. During the AM process it may be necessary to add support structures to a region of a part to be created in order to, for example, avoid part deformation during manufacturing and where the added support structures, added to the part during the AM process, will need to be removed during the SM process.

In powder bed fusion additive manufacturing for example, a heat source melts layer by layer the powder, and in direct metal deposition the material is added, commonly as a solid or powder, to a melt pool created by a heat source. During this process, support structures are required to support overhanging features while building a part by the AM process. When the part is finally built, the support structure may be removed by the SM process, which is often done manually and/or without direct communication with the AM componentry. In the present application, methods and systems embodiments are disclosed for optimizing removal of support structures in the SM process.

The present embodiments disclose methods and systems for receiving data related to the AM process, and removing the support structure based on that data within a computer aided manufacturing (CAM) environment. For example, various inputs may be communicated to a kernel from an AM application component, and the kernel in turn relays the data to an SM application component in the CAM environment. Such inputs may include the geometry of a part and/or a support structure, and the points of contact between features of the support structure, and certain regions of the part, such as a region to support (RTS) of the part. The SM application within the CAM environment may be used in some embodiments to program computer numerical control (CNC) machine tools. The CNC machine tools may be used to remove regions of a part, and in this case support structures from the part. CNC machine tools may also be used in machine shops for the production of discrete parts such as molds, dies, tools, prototypes, aerospace components, and more.

In some embodiments, the SM application may provide a tool path for a CNC cutting tool in order to remove the support structures from the RTS, as well as any other points of contact between the support structure and the part. In one embodiment, the support structures may be defined as additional elements used to prevent part deformation during the AM process. Support structures may be used to help construction of overhanging surfaces, anchor the part/surface to the build plate or other surfaces on the part, and assist in thermal dissipation. Support structures are not functional and need to be removed after the AM process. Additionally, when a support structure is added and then ultimately removed, there may be marks remaining on the part that occurred during the adding and subtracting of the support structure; therefore, the surface is finished/polished to remove said marks.

The RTS is related to the region of the part surface that needs to be connected to a support structure. In one embodiment, the RTS may be manually defined by a user by selecting a part surface at a user interface. In another embodiment, the part surface may be automatically selected by the AM system. Once the RTS has been defined, related support structures may be assigned to the RTS, and contact may be established by the support structure with the RTS.

The described technology concerns one or more methods, systems, devices, and mediums storing processor-executable process steps for removing a support structure supporting a region of a part in a CAM environment. In one embodiment, removing a support structure includes receiving, after the AM process, the geometry of the part and/or the support structure and points of contact between the support structure (e.g., contact lines or also referred to as support lines) and the part, such as points of contact along the RTS. In one embodiment, the RTS may be related to the region of the part surface that needs to be connected to the support structure. The support structure may have some extra elements to prevent part deformation during additive manufacturing. The input data may be received at an additive kernel after the AM process, and then communicated to an SM application by the additive kernel. In turn, the SM application within the CAM environment uses the received input data to create a tool path for a CNC tool to remove the support structure.

The techniques introduced below may be implemented by programmable circuitry programmed or configured by software and/or firmware, or entirely by special-purpose circuitry, or in a combination of such forms. Such special-purpose circuitry (if any) may be in the form of, for example, one or more application-specific integrated circuits (ASICs), programmable logic devices (PLDs), field-programmable gate arrays (FPGAs), etc.

FIGS. 1-18 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

With respect to FIG. 1, an example of a top-level functional block diagram of a computing device system 100 is illustrated. The system 100 is shown as a computing device 120 comprising a processor 124, such as a central processing unit (CPU), addressable memory 127, an external device interface 126, e.g., an optional universal serial bus port and related processing, and/or an Ethernet port and related processing, and an optional user interface 129, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 120, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 128. In some embodiments, via an operating system 125 such as one supporting a web browser 123 and applications 122 (e.g., AM application 20 and SM application 40 described below), the processor 124 may be configured to execute steps of a process for a user in a CAM environment to remove support structures that support an RTS based on the prior step of creating/adding the support structure to the RTS.

As described previously, in the course of formation, a part may have region of the part (or surface of the part) that may need to be further reinforced to help support the construction of the part. More specifically, a plurality of construction support lines may be introduced for connecting a support structure and a region to support the part. Upon construction of the part, the support structure may be subsequently removed.

Typically, additive manufacturing, or 3D printing, may include a variety of processes in which material is joined or solidified under computer control to create a three-dimensional object, with material being added together (such as liquid molecules or powder grains being fused together), typically layer by layer. Such layering may require certain areas to provide stronger support to the overall structure. The layered structure of such processes may inevitably lead to a stair-stepping effect on part surfaces which are curved or tilted with respect to the building platform. The effects may mainly depend on the orientation of a part surface inside the building process. In one embodiment, internal supports may be introduced for overhanging features during construction for such methods and processes. In some instances, overhang features, e.g., large regions hanging over a void without sufficient support from the lower structure may be unstable. Self-supporting overhang structures produced by additive manufacturing may then require additional layers of support to be produced and add additional complexity to the additive process, for example, to account for the layer thickness. Overhanging structures or features may then be accounted for and supported using the disclosed embodiments of the present application.

In the disclosed embodiments, after the additive manufacturing process is performed and the part with the support structure (also called the non-finished part or stock piece) is created, the building of the rest of the part is completed. Thereafter, the support structure may be removed in the subtractive process, and the part is then machined. More specifically, embodiments disclose how a tool path may be generated within the CAM environment based on data related to the AM process to then remove the support structure with a CNC cutting tool.

Figure 2:
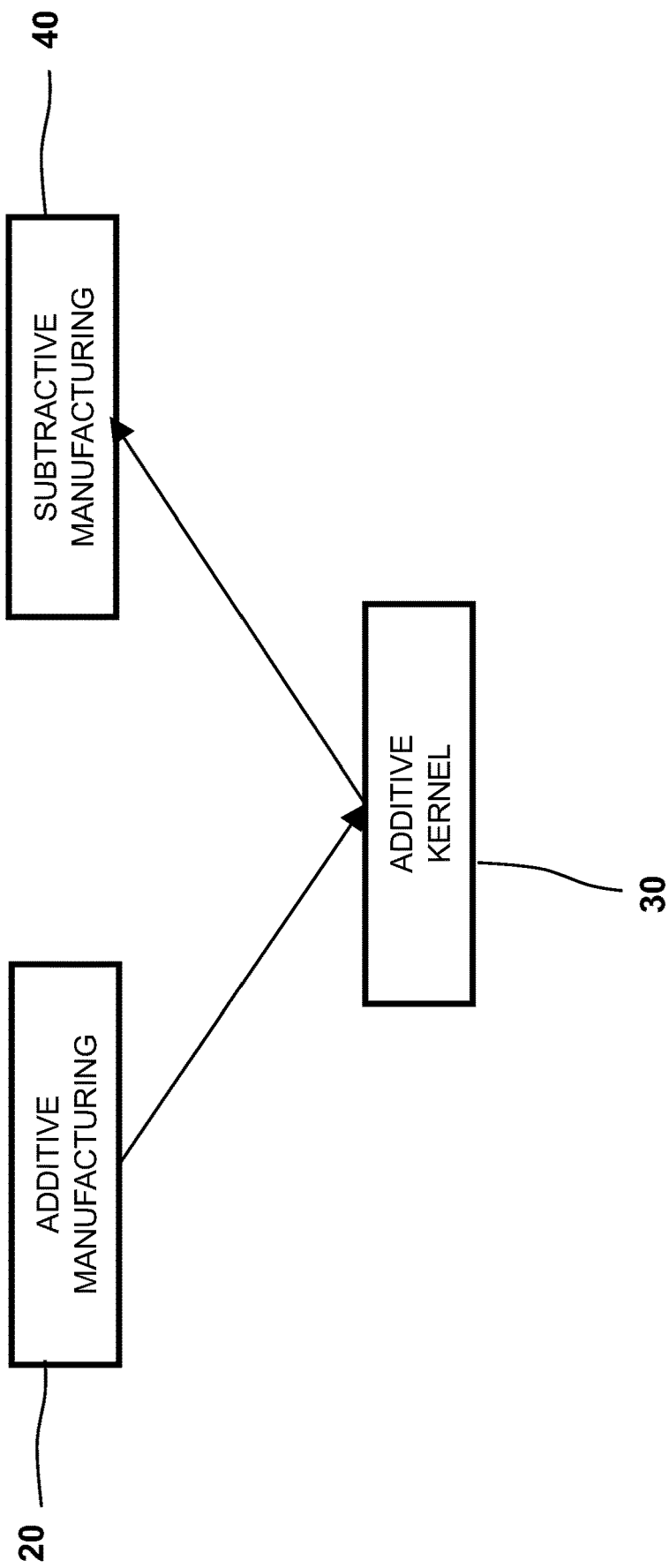
FIG. 2 depicts a flow diagram of a communication process within a CAM environment.

With respect to FIG. 2, communication between the additive manufacturing process and the subtractive manufacturing process within the CAM environment is illustrated. In one embodiment, data related to the construction of a support structure may be sent from an additive manufacturing (AM) application 20 to a kernel, for example, an additive kernel 30. In one embodiment, the additive kernel 30 is the central component of the CAM operating system that manages communication from the AM process to the subtractive manufacturing (SM) process. The additive kernel 30 may act as a bridge between the AM and SM applications and perform data processing at the hardware level using inter-process communication and system calls. An SM application 40 may receive data from the additive kernel 30 related to the AM process carried out by the AM application 20. For example, the additive kernel 30 may receive the information related to the geometry of the support structure and the part, as well as the position or location of a set of connecting lines between the support structure and a region to support (RTS) of the part determined during the AM process. The additive kernel 30, in turn, may relay the data to the SM application 40 within the CAM environment. In one embodiment, the SM application 40 may generate a tool path for a cutting tool in order to remove the support structures from the RTS, based on the data received from the additive kernel 30.

Figure 3:
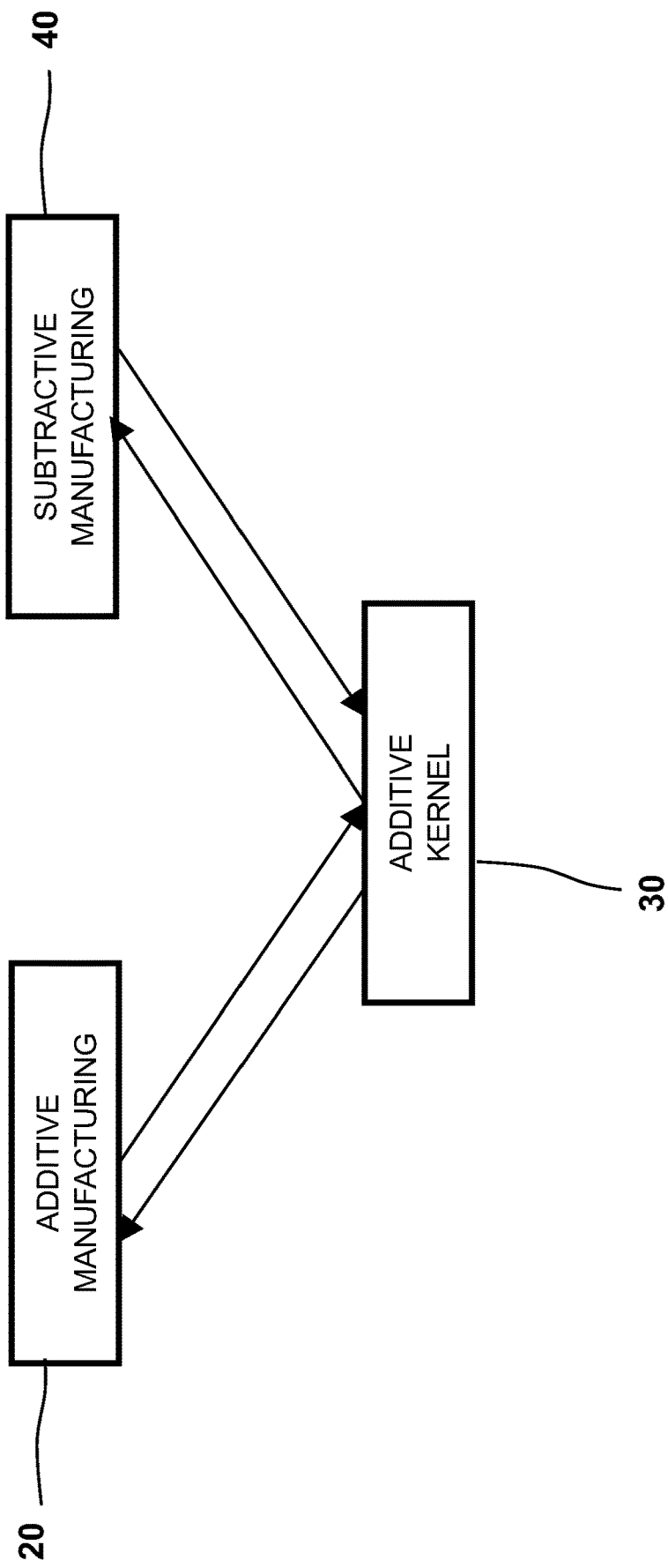
FIG. 3 depicts an alternative flow diagram of communication process within a CAM environment.

In another embodiment, and with respect to FIG. 3, the SM application 40 may communicate back to the AM application 20. For example, the SM application 40 may find that the generated tool path, which is based on the support structure data sent from the AM application 20 after completion of the AM process, may result in poor accessibility to the RTS; therefore, the SM application 40 may relay this error to the AM application 20 via the additive kernel 30. The AM application 20 may then modify the support structure to make the support structure more accessible to the tool for cutting/removal. In that way, the system 100 is dynamic in nature in order to optimize the removal of the support structure.

Figure 4:
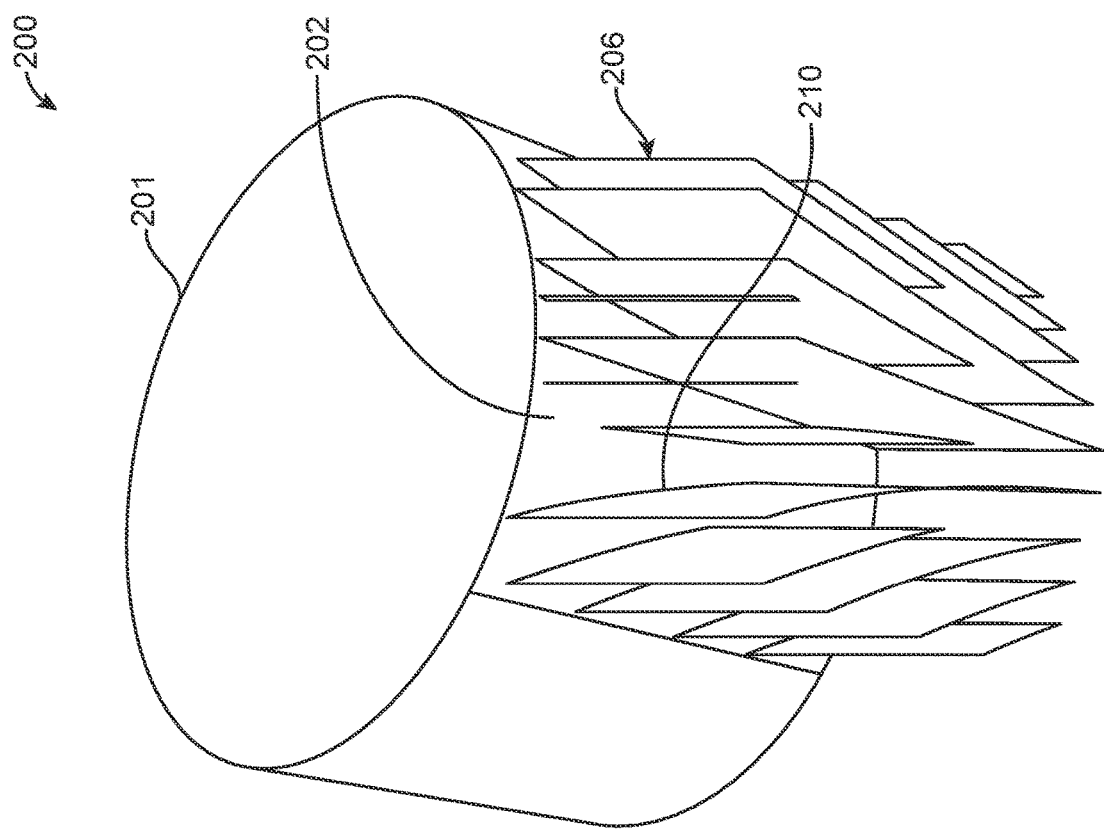
FIG. 4 depicts a graphical representation of a support structure and a region to support.

With respect to FIG. 4, a graphical representation of a region to support (RTS) 202 of an overhanging region 201 of a part 200 is shown. In one embodiment, the region 202 may be defined by the angle that the surface of the region 202 subtends relative to the (negative) z direction, shown as the downward vertical direction in FIG. 4. In one embodiment, the system may create a new, three-dimensional support structure 206 with the additive application 20 of the computing device 120, where the new support structure 206 may provide additional structural support to the RTS 202 of the part 200 to be created. The support structure 206 may include contact lines 210. In one embodiment, the contact lines 210 may connect the support structure 206 to the region to support 202. The support structure 206 may provide for avoiding deformation of the part 200, such as warping due to thermal effects. In one embodiment, the support structure 206 to be created may fit the contour of the RTS 202.

In one embodiment, a user may construct a new support structure to support a region 202 of a part which requires support. In one embodiment, creating a support structure includes determining a position of contact lines for connecting the support structure and a region to support the part to be created. In one embodiment, the region to support (RTS) may be related to the region of the part surface that needs to be connected to the support structure. The final three-dimensional support structure 206 may be constructed by iteratively adding, removing, and/or terminating contact lines to the RTS 202 based on receiving continuous and real-time or near real-time feedback from the SM process.

Figure 5:
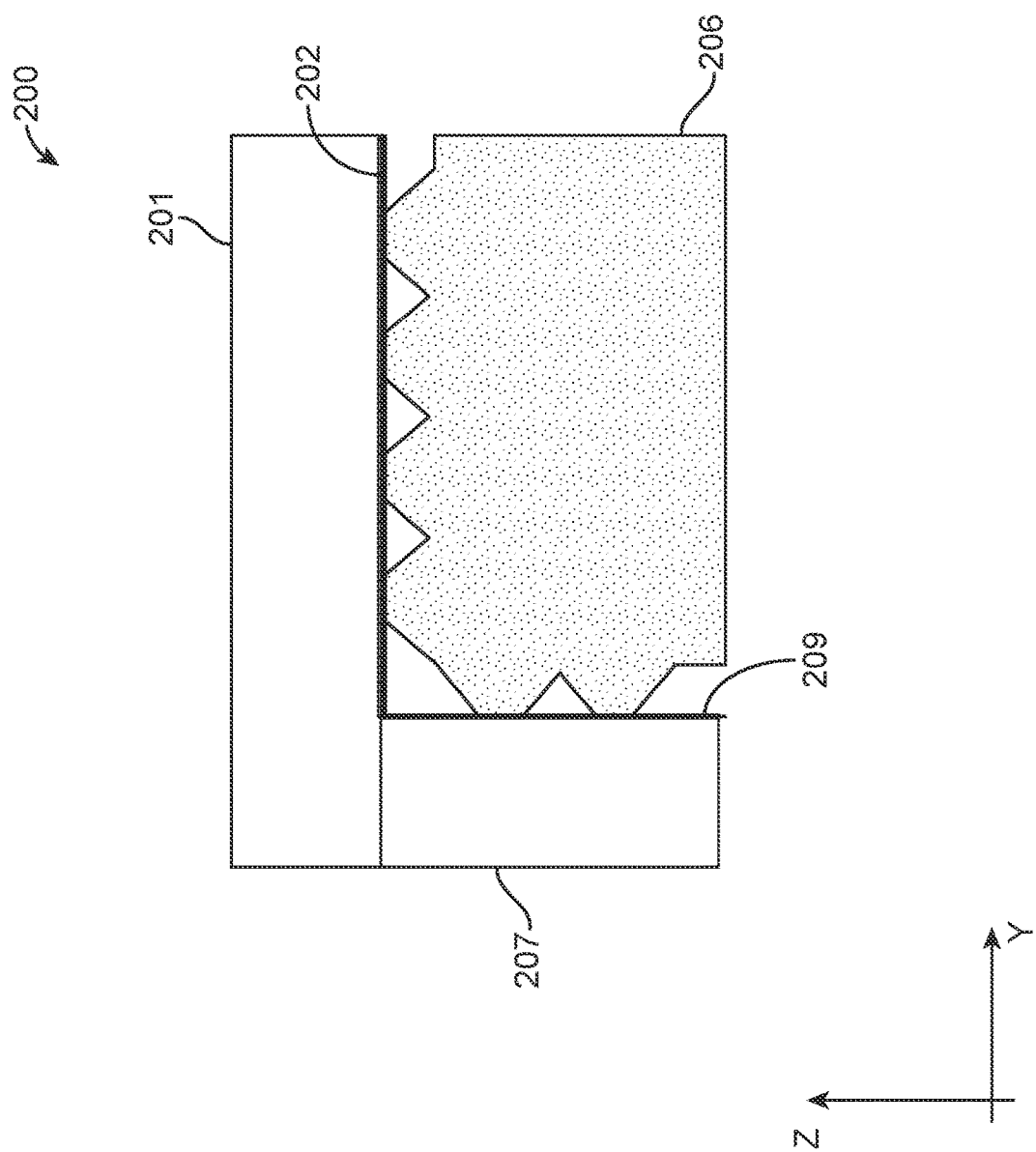
FIG. 5 depicts a side view of a support structure for a support region of a part.

With respect to FIG. 5, a simplified side view of the part 200 in the x-z plane is shown. The part 200 includes the overhanging portion 201 that is supported by the support structure 206 and a vertical portion 207 that is also in contact with the support structure 206. In one embodiment, the part 200 may have a contact line 209. In one embodiment, the contact line 209 may represent points of contact between the support structure 206 and the RTS in the z direction, as well as the support structure 206 and the vertical portion 207 in the y direction.

Figure 6:
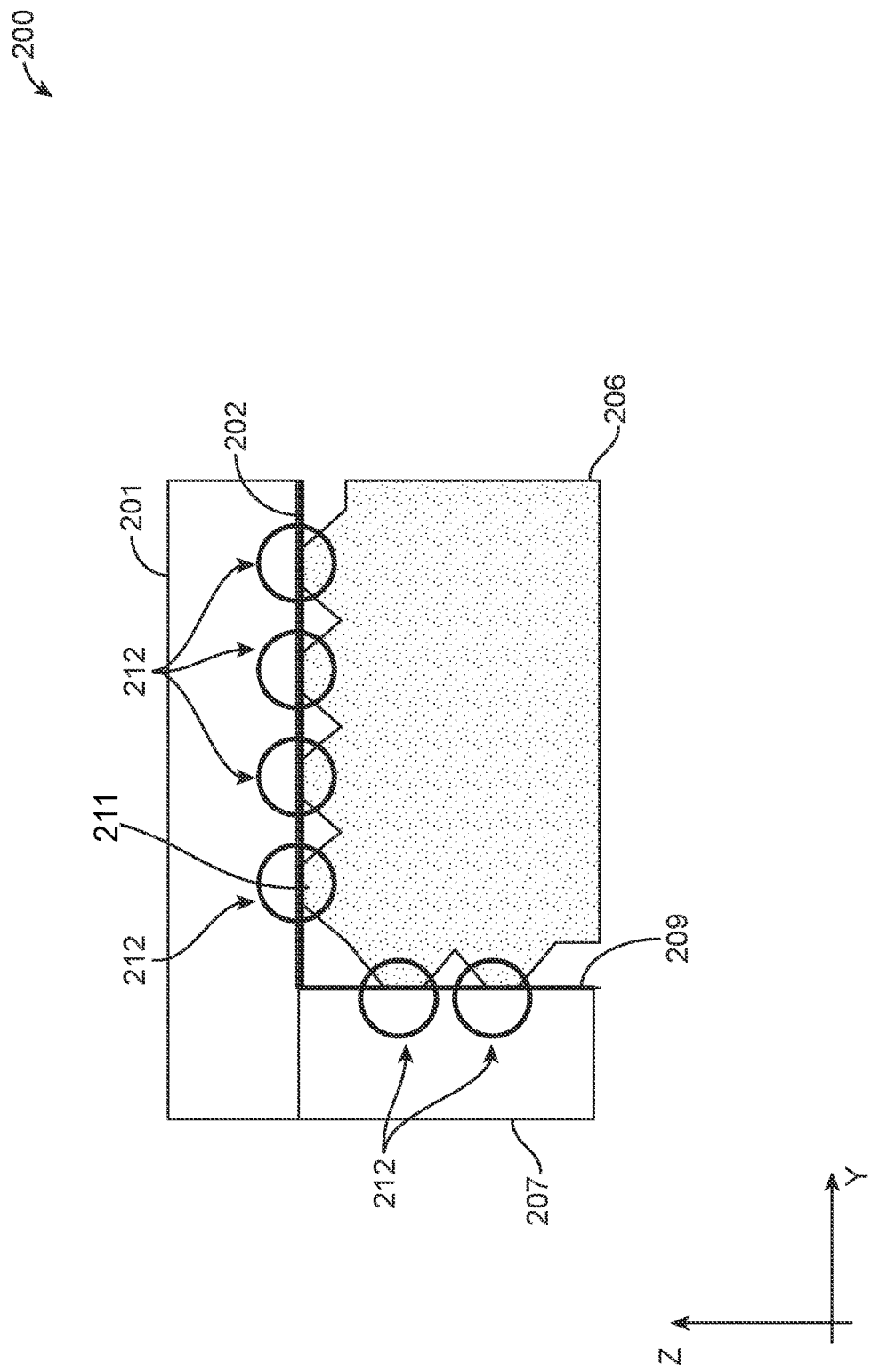
FIG. 6 depicts a side view of the part of FIG. 5 with a plurality of contact points.

FIG. 6 depicts the same simplified side view of the part 200 with some additional details. In one embodiment, the contact line 209 may represent surfaces where a plurality of contact areas 212, highlighted with open circles for clarity, to show where the support structure 206 contacts the part, such as at the RTS 202 and at the vertical portion 207. In one embodiment, the contact points 212 may include a plurality of surfaces, in this example shown in the shape of teeth 211. Teeth 211 show how the support structure comes into contact with the region to support. In some embodiments, the teeth 211 may be line or point or surface, depending on the structure of the support. In another embodiment, the contact areas 212 may include lines points or surface, such as contact lines 209 described above. In one embodiment, the support structure 206 may be a volume support, a surface support or a lattice structure support.

Figure 7:
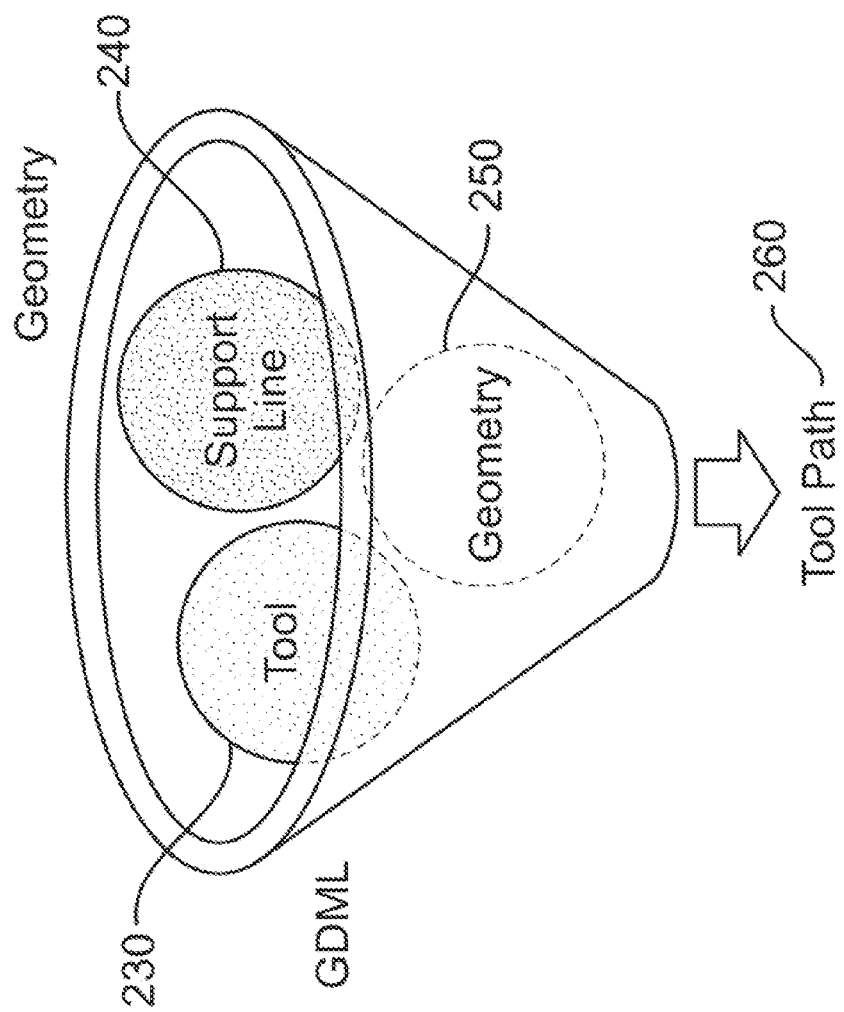
FIG. 7 depicts a graphical representation of the generation of a tool path for removal of the support structure of FIG. 5.

FIG. 7 illustrates the SM application and how it may provide a tool path 260 to remove the support structure 206 along the contact line 209. The tool path 260 may be based on data related to the AM process, and removing said support structure based on that data within a computer aided manufacturing (CAM) environment. For example, a set of inputs, such as (1) the position or location of a set of contact points (e.g., connecting teeth, lines or points between support structures and a region to support (RTS) of the part determined), (2) a cutting tool, and (3) the geometry of the part and/or support structure may be communicated to a kernel (e.g., additive kernel 30) from an AM application (e.g., AM application 20 of FIGS. 2-3). The kernel in turn relays the input data to an SM application (e.g., SM application 40 of FIGS. 2-3)) in the CAM environment.

In some embodiments, the SM application 40 passes the tool path 260 to a CNC cutting tool in order to remove the support structure from the RTS. More specifically, the SM application 40 may provide the tool path 260 to the additive kernel 30 based on inputs, including: (1) a contact line input file 240 specifying the points of contact between the support structure 206 and the part 200 along the contact line 209, (2) a cutting tool 230 (e.g., a cutting tool in the form of a data file), and (3) a file specifying the geometry 250 of the part (e.g., the geometry of part 200). The additive kernel 30 may then make this information available to the SM application 40. In another embodiment, the three data inputs 230, 240, 250 may be embedded in a single file to send to the additive kernel 30 from the AM application 20.

In some embodiments, the kernel may be the same and there may be two files for additive and subtractive actions. The disclosed system and method may allow for accurate and precise support removal as compared to variable hand removal. In some embodiments, the support removal may communicate with the same kernel to optimize part production. The kernel may modify the shape, size, depth or other features of the support structures in embodiments where the support removal is more time consuming, less optimal, or the like. The kernel may therefore optimize creation of a part using both additive and subtractive actions based on feedback during the additive and subtractive portions.

Figure 8:
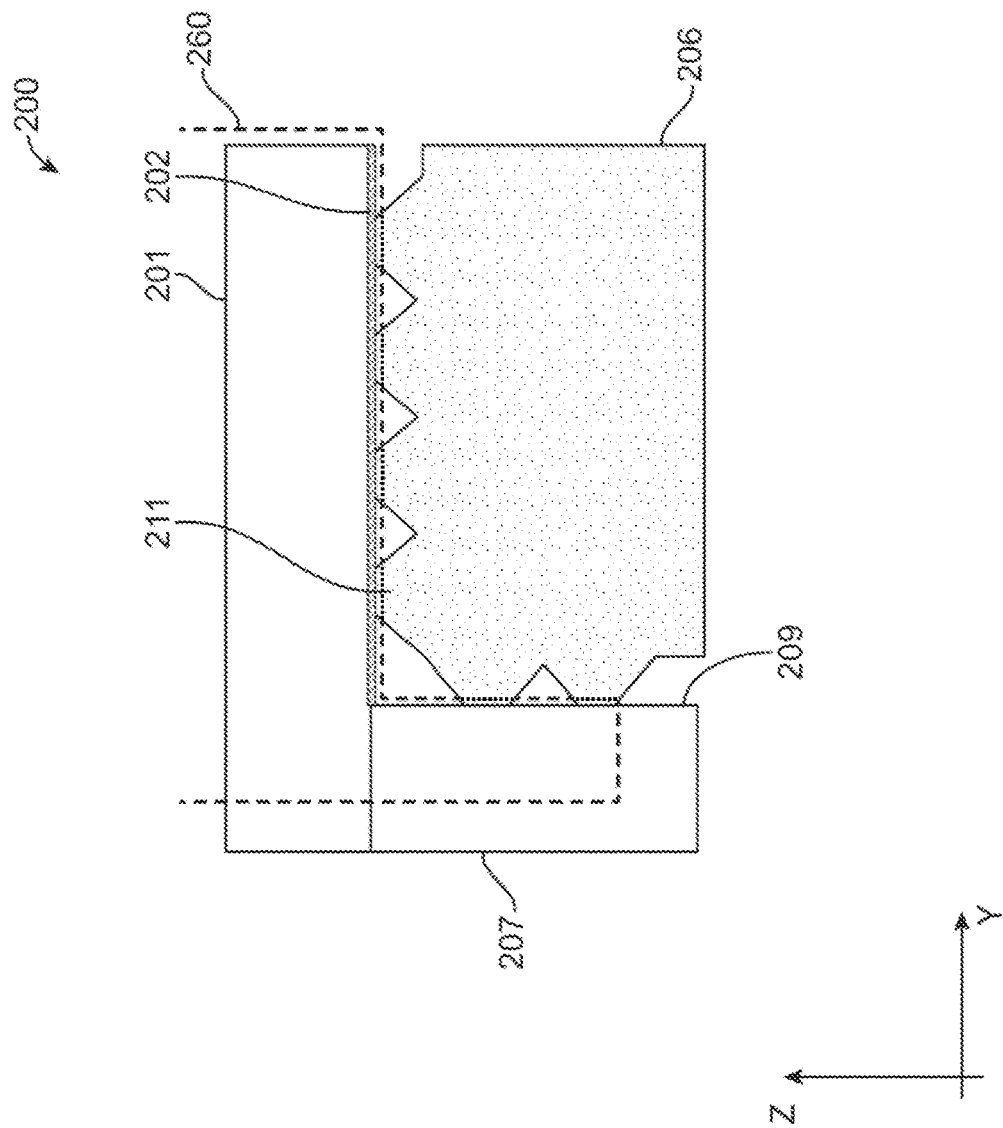
FIG. 8 depicts a side view of the part of FIG. 5 with a tool path for removal of the support structure.
Figure 9:
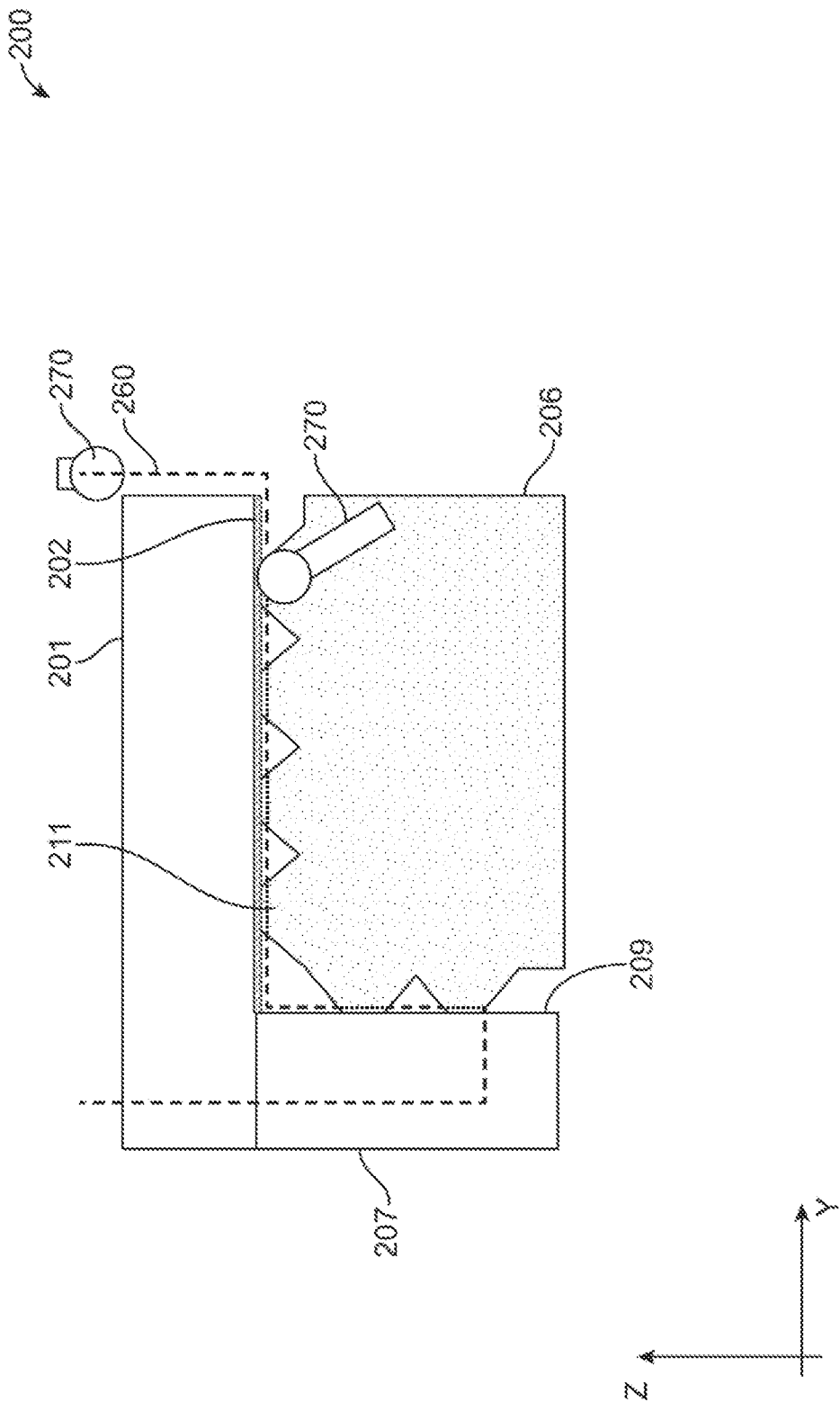
FIG. 9 depicts a cutting tool for removal of the support structure along the tool path of FIG. 8.
Figure 10:
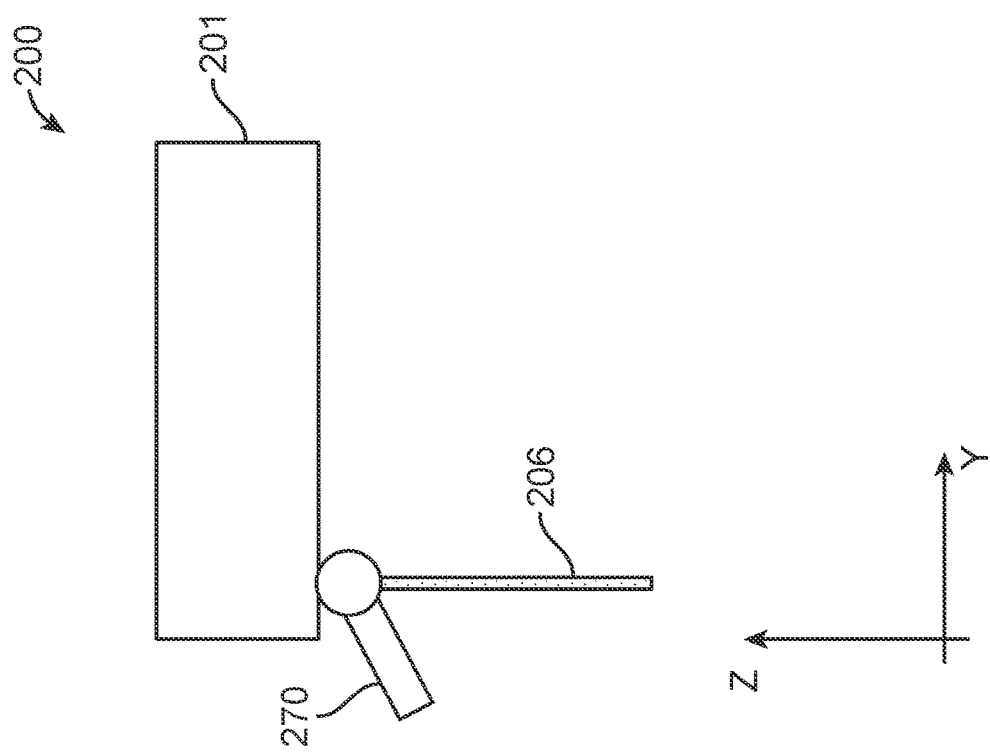
FIG. 10 depicts a top view of the cutting tool for removal of the support structure along the tool path of FIG. 9.

With respect to FIGS. 8-10, the tool path 260 generated by the SM application 40 is shown as a dashed line. More specifically, and with respect to FIG. 8, the SM application 40 may provide the tool path 260 to remove the support structure 206 along the contact line 209. As such, the CNC machine receives instructions as to where to cut using the cutting tool based on the initial AM process; furthermore, the points of contact 212 along the contact line 209 are known to the CNC machine because the geometry of the support structure 206 and the RTS had been previously defined in the AM process. Therefore, the support structure 206 may be removed along the contact line 209 both at the vertical portion 207 and at the overhanging portion 201.

FIG. 8 highlights how the tool path 260 may remove the support structure 206. In one embodiment, the solid dashed line portion of the tool path 206 may indicate rapid movement of a CNC cutting tool along the tool path 260, and the dotted dashed line portion may indicate where cutting of the teeth 211 of the support structure 206 will occur. As described above, this is because the tool path 260 is determined based on data and instructions received from the AM process to indicate where the teeth 211 contact the part 200.

FIG. 9 depicts the part 200 and support structure 206 of FIG. 8 with the addition of illustrating a cutting tool 270 shown travelling along the tool path 260 at different points. At the dotted dashed line portions of the tool path 260, the cutting tool 270 may cut the support structure 206 away from the points of contact between the support structure 206 and the part 200, such as where the teeth 211 contact the RTS 202 of the overhanging portion 201 and where the teeth 211 contact the vertical portion 207.

FIG. 10 shows a top view of the cutting tool 270 moving along the tool path 260 in the y-z plane. More specifically, the cutting tool 270 may encounter a support structure 206 along the overhanging region 201 that may be a surface having a thinner surface, e.g., wall, than other surfaces such that minimal material needs to be cut. In one embodiment, a single tool path may remove the thin support structure wall 206.

Figure 11:
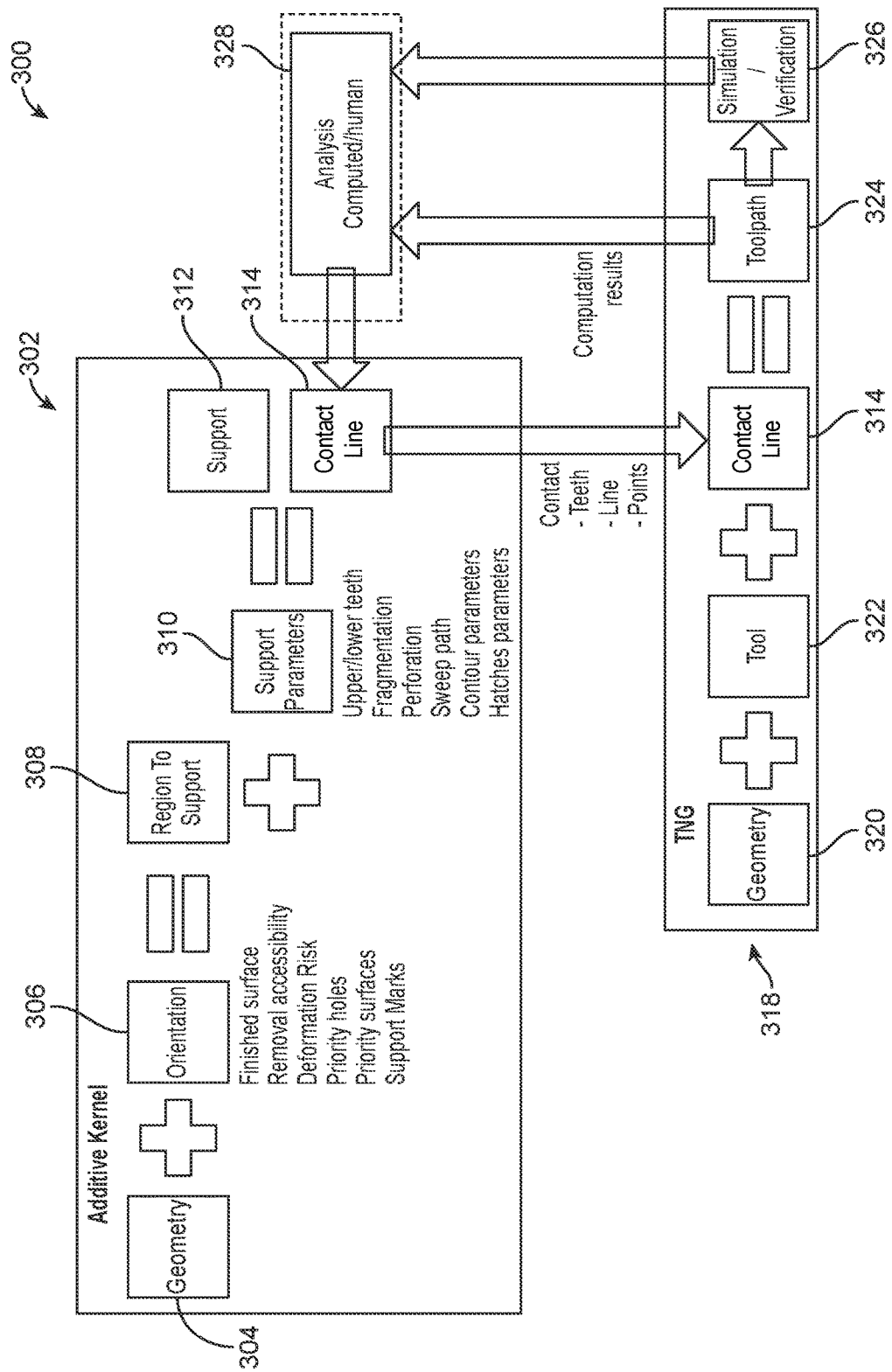
FIG. 11 depicts a flow diagram for removal of a support structure.

With respect to FIG. 11, a flow diagram 300 illustrates the removal of a support structure based on the additive process in a CAM environment. An AM application, such as AM application 20 (see FIGS. 2-3) may provide at least a contact line and a part geometry to the additive kernel 30. The SM application may receive the contact line and part geometry, and, along with a cutting tool, from the additive kernel 30 to provide a tool path to remove a support structure along a contact line. The tool path may be based on data related to the AM process, and removing the support structure based on that data within a computer aided manufacturing (CAM) environment. For example, a set of inputs may be received at an additive kernel 302 (e.g., additive kernel 30 described above). In one embodiment, the inputs received at the additive kernel 302 may include a geometry 304 of the support structure to be removed from a part as well as the geometry of the part itself, along with an orientation 306. In another embodiment, the inputs received at the additive kernel 302 may include just the geometry 304 of the support structure to be removed from a part, as well as an orientation 306. In another embodiment, the inputs received at the additive kernel 302 may include just the geometry of the part itself, as well as an orientation 306.

In one embodiment, the contact line 314 (see also FIG. 9 reference number 209) may be a contact line input file, such as contact line input file 240 (see FIG. 7) specifying the contact between the support structure and the part, such as contact teeth lines and/or points (e.g., contact points 212 contact teeth 211 and contact lines 209 described above). The additive kernel 302 in turn relays the contact line 314 and the geometry 304 to an SM application 318 (e.g., SM application 40 described above). The SM application 318 may select a tool 322 (see also FIG. 9 reference number 270), such as a cutting tool. In some embodiments, the cutting tool may be a milling cutter, a lathe, or a combination of tool-electrodes, and workpiece-electrodes. In one embodiment, the cutting tool may be represented in the form of a data file.

In some embodiments, the SM application 318 may generate a tool path 324 (see also FIG. 9 reference number 260) based on the geometry 320, the tool 322, and the contact line 314. The SM application 318 may pass the tool path 324 to a CNC cutting tool in order to remove the support structure(s) from the RTS. Therefore, the subtractive tool path 324 may be generated based on the parameters received from the additive kernel which were used to construct the support structure 312 (see also FIG. 9 reference number 206). In an additional embodiment, the subtractive tool path 324 may be generated further based on input from the additive manufacturing application. In the present embodiments the additive component and the subtractive component are in communication with each other, and, as such, the CNC machine may determine how to remove the support structure during the subtractive process based on the prior additive process.

In additional embodiments, the tool path 324 may be passed to a simulation/verification component 326 in the CAM environment for virtual verification of the subtraction of the support structure. Both the tool path 324 and the verification results of the support structure removal may be transmitted to an analysis component 328 for analysis of the subtraction process. In one embodiment, the analysis may be carried out by inspection of the part by comparing one or more parameters against a set of thresholds determined by the overall system or an operator. In another embodiment, the analysis component 328 may be integrated into the additive kernel 30, creating an integrated design. In yet another embodiment, the analysis component 328 may be external to the additive kernel 30 and the subtractive application 40, and may be integrated into a global manufacturing layer to provide for communication between the additive application 20 and the subtractive application 40. In yet another embodiment, the additive kernel 30, the AM application 20, and the SM process 40 may all be run on the same computing device having a processor and addressable memory. In another embodiment, the analysis of the subtraction process may be analyzed by an analysis module of the CAM environment. The analysis may be used to apply any changes to the support 312 and the contact line 314. The analysis may be determined based on accessibility and collision avoidance on the SM process. The system may adjust parameters in FIG. 13B along with the geometry orientation in order to respect FIG. 13A and be able to do machining of the support structure. In the disclosed embodiments, the system design provides a communication bridge between the additive and subtractive components, thereby increasing efficiencies of processing a part that goes through AM and SM. Such efficiencies may be defined in view of the SM application and the part being cut.

In one embodiment, the SM application 318 may communicate back to the additive kernel 302, and the additive kernel 302, in turn, may communicate with the AM application. This may provide for dynamic addition and removal of a support structure. For example, the SM application 318 may determine that the generated tool path, which is based on the support structure data sent from the AM application to the AM additive kernel 302 after completion of the AM process, results in poor accessibility to the RTS 308 (see also FIG. 9 reference number 202). The RTS 308 along with a plurality of support parameters 310 provide a support structure 312 and a contact line 314. Thereafter, the SM application 318 may relay this information, for example, in the form of an error message, to the AM application via the additive kernel 302. In one example, accessibility may be determined by collision detection. That is, a tool might collide with the target if it is too big or if the shape is not appropriate. The disclosed embodiments provide a method for determining tool path that may suggest preferred tool change and/or tool path parameters.

The AM application may then modify the support structure 312 to make the support structure 312 more accessible to the tool 322 for cutting/removal of the support structure 312. In this way, the system is dynamic in nature to optimize the removal of the support structure 312. In one embodiment where the system provides feedback from one component (SM) to another component (AM) the system creates a hysteresis effect which may be defined as the dependence of the state of a system on its history.

Figure 12:
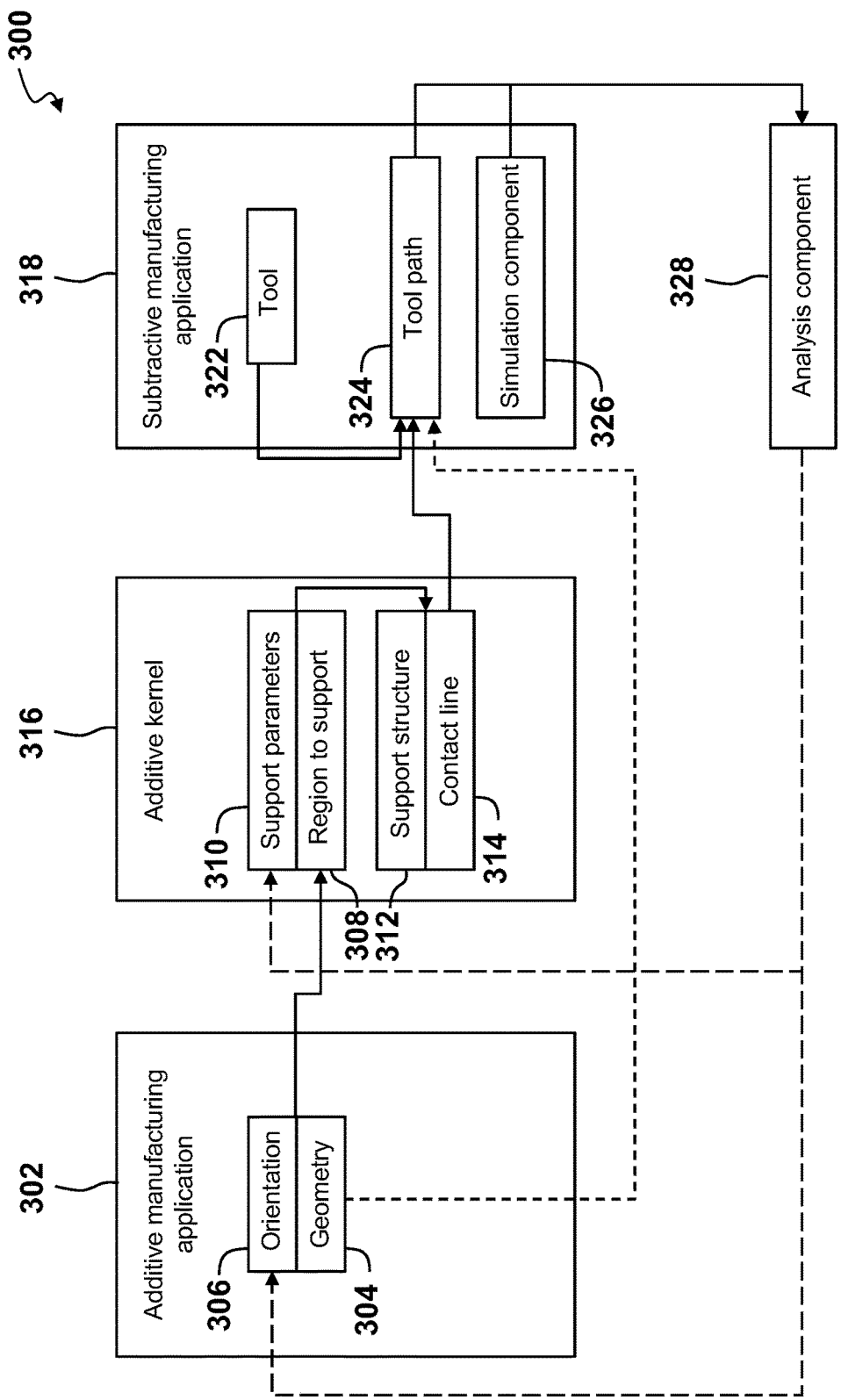
FIG. 12 depicts a block diagram of dataflow for removal of a support structure.
Figure 13:
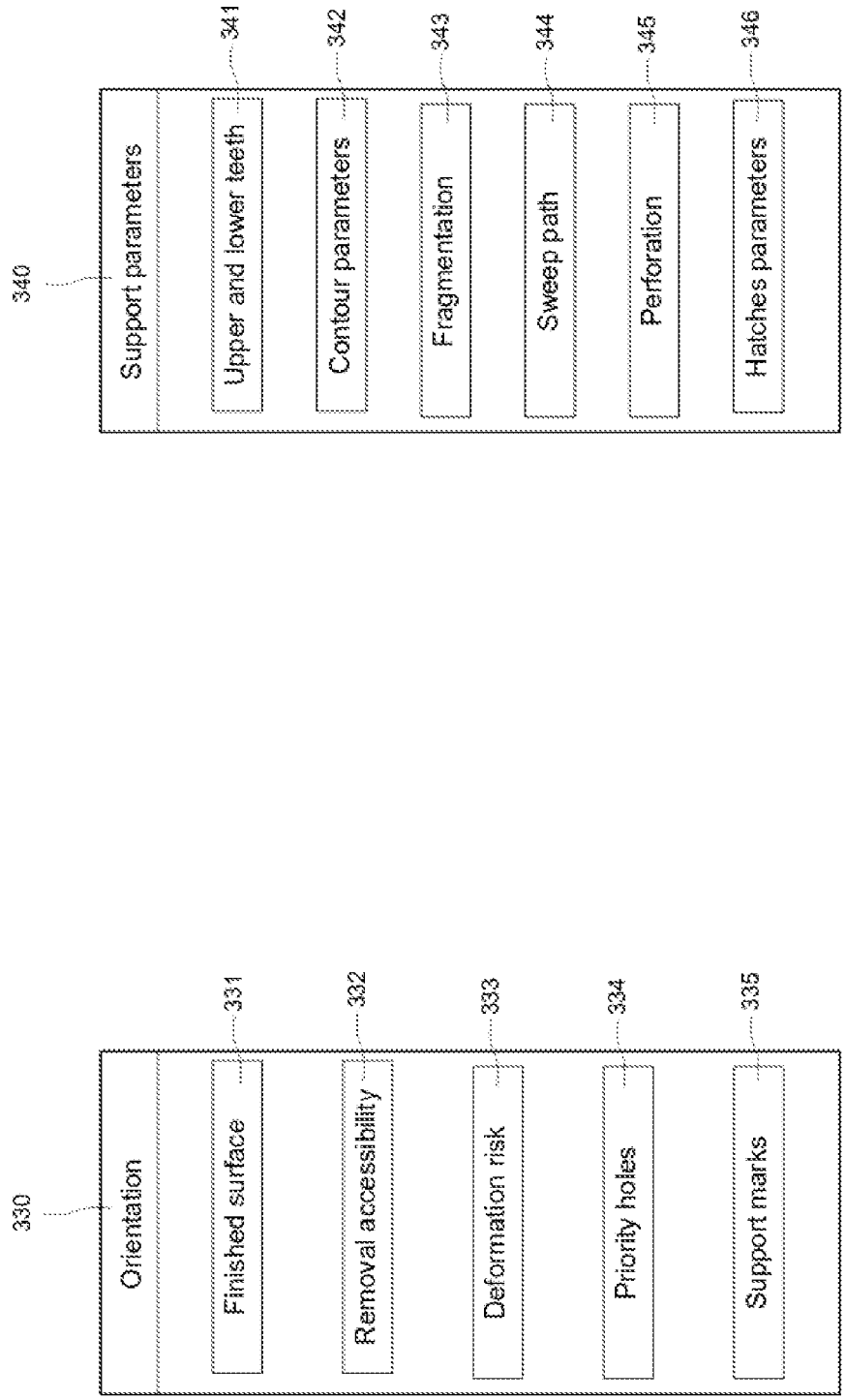
FIGS. 13A-B respectively depicts block diagrams of the support parameters and orientation, according to some embodiments of the present disclosure.

With respect to FIG. 12, a flow diagram 300 illustrates dataflow during the removal of a support structure based on the additive process in a CAM environment. In one embodiment, the AM application 302 may use geometry 304 along with orientation 306 to then, via an additive kernel 316, determine a region to support 308 and support parameters 310. The additive kernel 316 may also determine and transmit a support structure 312 and contact line 314 where the additive kernel 316 may transmit the contact line to the subtractive manufacturing application 318. The subtractive manufacturing application 318 may also receive as input the geometry 304 to then determine a tool path 324 to remove a support structure along a contact line based on the geometry 304, tool 322, and contact line 314. The subtractive manufacturing application 318 may also include a simulation component 326 which may run a simulation using the received data to perform a verification of the determined tool path 324. The subtractive manufacturing application 318 may then transmit the results of the performed verification process by the simulation component 326 to an analysis component 328 to analyze how the contact line 314 may be updated for a more efficient cutting of the part. The Analysis component 328 may then transmit the resulting analysis to the additive kernel 316. The additive kernel 316 may update and determine a new contact line based on the received analysis for use by the additive manufacturing application 302.

Referring to FIG. 13A, in one embodiment, the orientation 330 may include data regarding the finished surface, the removal accessibility of the support structure, the deformation risk of the part, priority holes and priority surfaces, and support marks marking where the support structure contacts the part. In one embodiment, the priority holes and priority surfaces may be parameters of high priority while determining the orientation 330. For example, if a hole is of high priority, then the SM application 40 may find an orientation 330 where the hole will not suffer from, for example, overhang. The input geometry 304 and orientation 330 in turn yield a region to support (RTS), such as RTS 308 (see FIG. 11).

Referring now to FIG. 13B, in one embodiment, the support parameters 340 may include upper and lower teeth 341, contour parameters 342, fragmentation 343, a sweep path 344, perforation 345, and hatches parameters 346. For example, fragmentation parameters 343 may describe the amount of fragmentation or separation within the support structure. The upper and lower teeth parameters 341 may control the height, width, and depth of the teeth included in the support structure. The perforation parameter 345 may control the porousness of the support structure. The sweep path parameter 344 may control the production of the surface. The contour parameter 342 may control the contour of the RTS that may be used to receive support structures surfaces. Finally, the hatches parameter 346 may control the support structures strategy to fill the contour.

Figure 14:
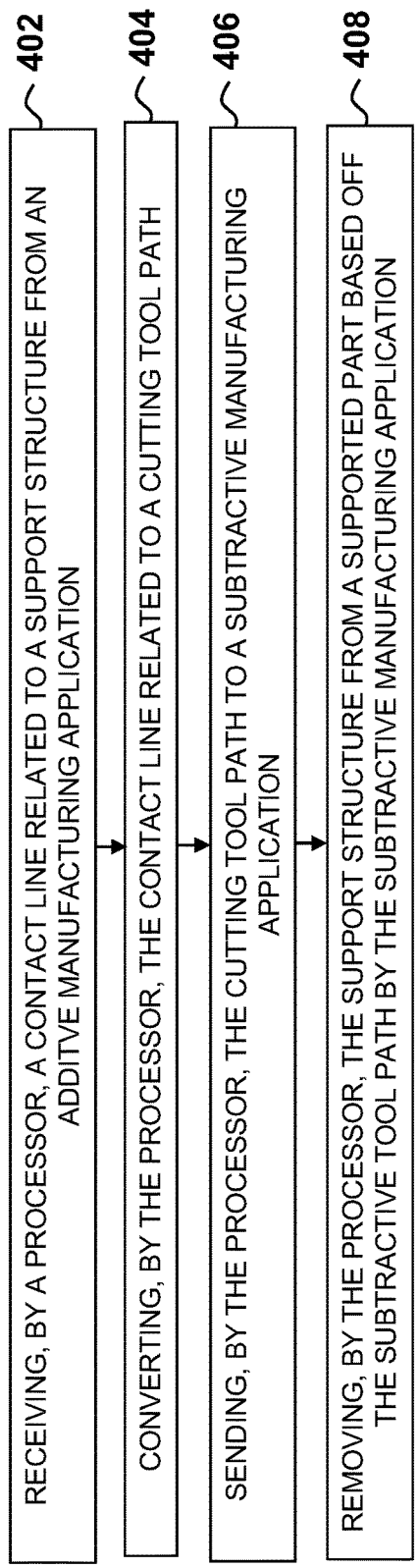
FIG. 14 depicts a flow chart of a method for removing support structures.

FIG. 14 is a high-level flow chart of a method 400 for removing support structures, according to an embodiment of the disclosure. The method 400 may include a step 402 for receiving a contact line generated by an additive manufacturing application. The method 400 may then include a step 404 for generating a tool path for subtractive manufacturing based on receiving the contact line. The generating of the tool path for subtractive manufacturing may be done based on input parameters received from the additive kernel. The method 400 may then include a step 406 for sending the converted tool path to a subtractive manufacturing application. The method 400 may then include a step 408 for removing the support structure from a supported part based on the tool path by the subtractive manufacturing application. Additional steps may be performed where the AM process receives feedback from the SM process in the form of analysis data of the cutting and efficiency of removing the support structures in order to dynamically update the AM process in generating parts having support structures added to them in areas to make the removal more efficient than the previous iteration.

Figure 15:
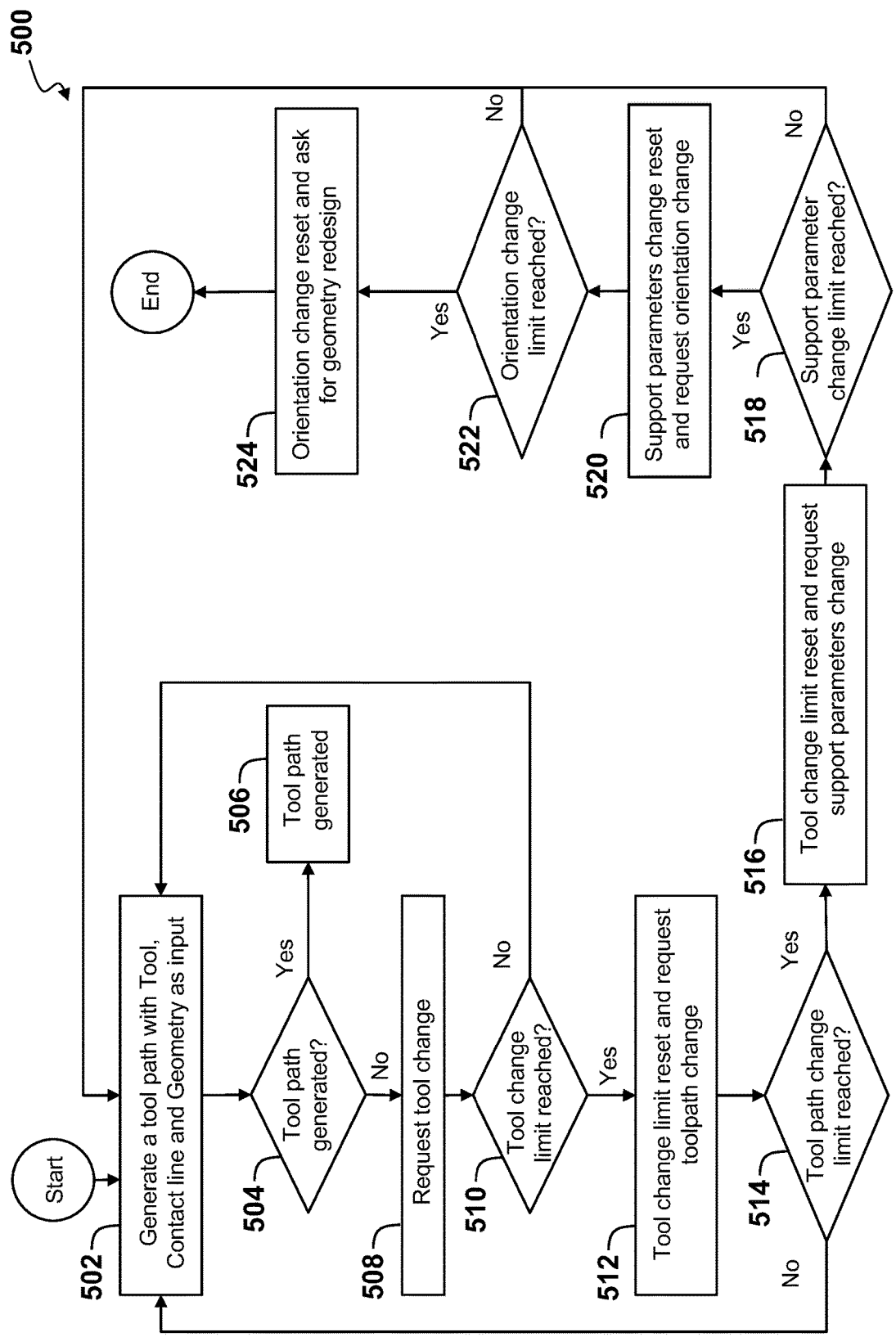
FIG. 15 depicts a flow chart showing how an additive kernel optimizes the removal of a support structure.

FIG. 15 is a flow chart 500 showing how the analysis component 328 optimizes the removal of the support structure. The disclosed systems and methods may initiate generation of a tool path with tool data, contact line, and geometry as input. If the generation is successful the tool path is generated, however, if tool path is not generated, a tool change may be requested and based on whether a tool change limit is not reached, the tool change limit is reset and a request for a tool path change is generated. Tool path change limit may be reset and a request for a change in support parameters is sent if the limit is not reached. Next an orientation change reset is made and a request for geometry and redesign is sent.

Referring again to FIG. 15, the analysis component 328 as part of the SM process receives as input a set of data including tool data (e.g., tool information of the CNC machine), contact line, and geometry (step 502). The process may then determine whether a tool path may be successfully generated taking into account, for example, accessibility and collision avoidance for the cutting (step 504). If successful, then the tool path is generated (step 506). If the tool path is not successfully generated, for example, running the current tool path would cause a collision of the tool with the part, then the process may move on to request a tool change (step 508). The analysis component 328 may then provide the new tool information to be analyzed, based on not having reached a tool change limit (510). The process may now start the process again to determine if a tool path may be successfully generated (step 506). If the tool change limit has been reached (step 510) then the process may perform a tool change limit reset and request a tool path change (step 512). As before, if the tool path change limit is reached (step 514) the process may move to reset the tool change limit and request a change in the support parameters (step 516). If tool path limit has not been reached yet, the process returns to the generating of a tool path (step 502). After the tool change limit reset and request for support parameters change, the process checks to determine whether the support parameter change limit has been reached (step 518). If the limit has been reached, then the process performs a support parameters change reset and request orientation change (step 520). If the support parameter change limit has not been reached, the process may return to the generating of a tool path step (502). The process may continue after the support parameters change reset and request orientation change to determine if the orientation change limit has been reached (step 522). If the limit has not been reached, the process may return to generate a tool path (step 502). If the limit has been reached and still not able to generate a tool path, the process moves to perform an orientation change reset and ask for a geometry redesign (step 524).

Figure 16:
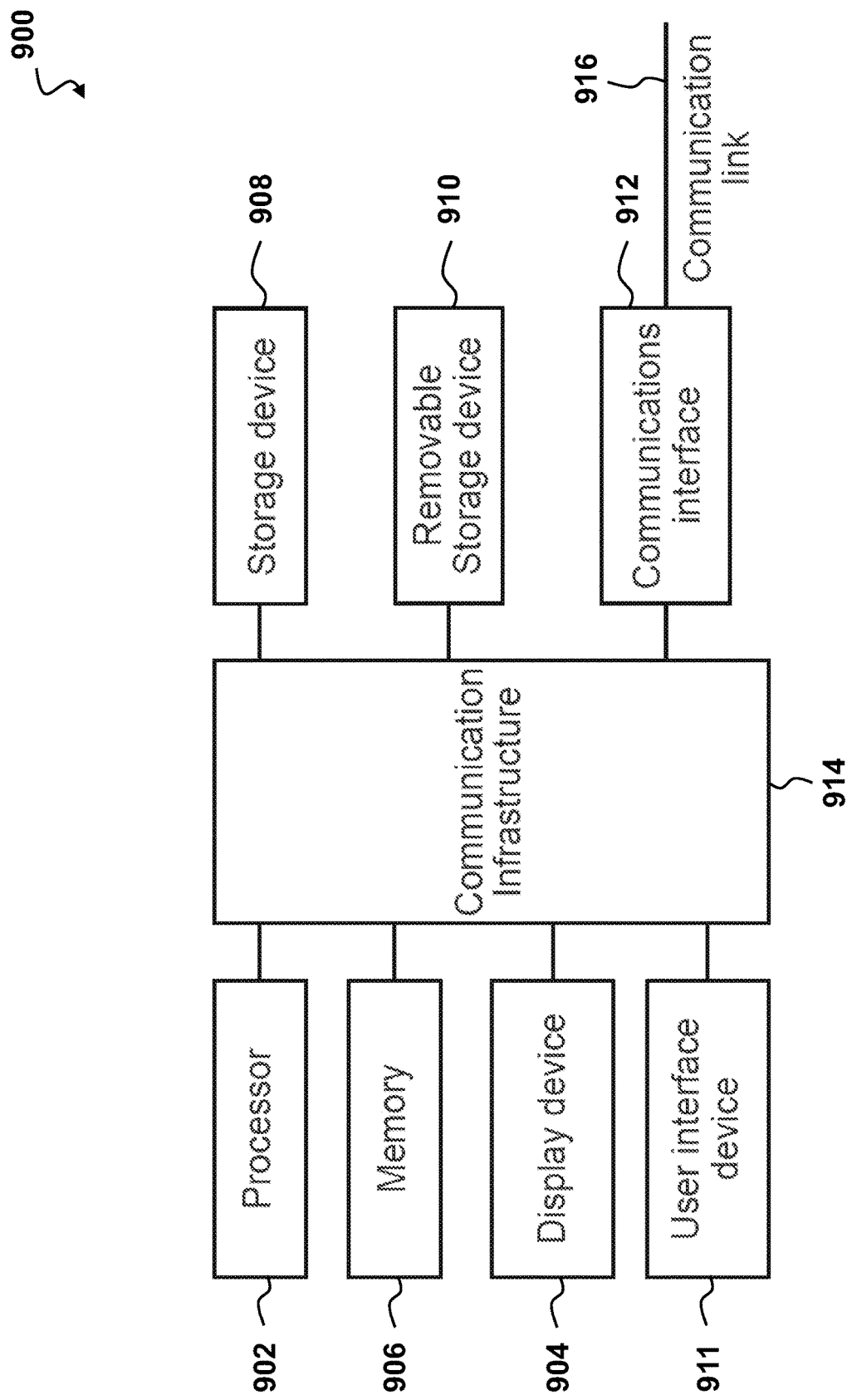
FIG. 16 shows a high-level block diagram and process of a computing system for implementing an embodiment of the system and process.

FIG. 16 is a high-level block diagram 900 showing a computing system comprising a computer system useful for implementing an embodiment of the system and process, disclosed herein. Embodiments of the system may be implemented in different computing environments. The computer system includes one or more processors 902, and can further include an electronic display device 904 (e.g., for displaying graphics, text, and other data), a main memory 906 (e.g., random access memory (RAM)), storage device 908, a removable storage device 910 (e.g., removable storage drive, a removable memory module, a magnetic tape drive, an optical disk drive, a computer readable medium having stored therein computer software and/or data), user interface device 911 (e.g., keyboard, touch screen, keypad, pointing device), and a communication interface 912 (e.g., modem, a network interface (such as an Ethernet card), a communications port, or a PCMCIA slot and card). The communication interface 912 allows software and data to be transferred between the computer system and external devices. The system further includes a communications infrastructure 914 (e.g., a communications bus, cross-over bar, or network) to which the aforementioned devices/modules are connected as shown.

Information transferred via communications interface 914 may be in the form of signals such as electronic, electromagnetic, optical, or other signals capable of being received by communications interface 914, via a communication link 916 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, may be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 912. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 17:
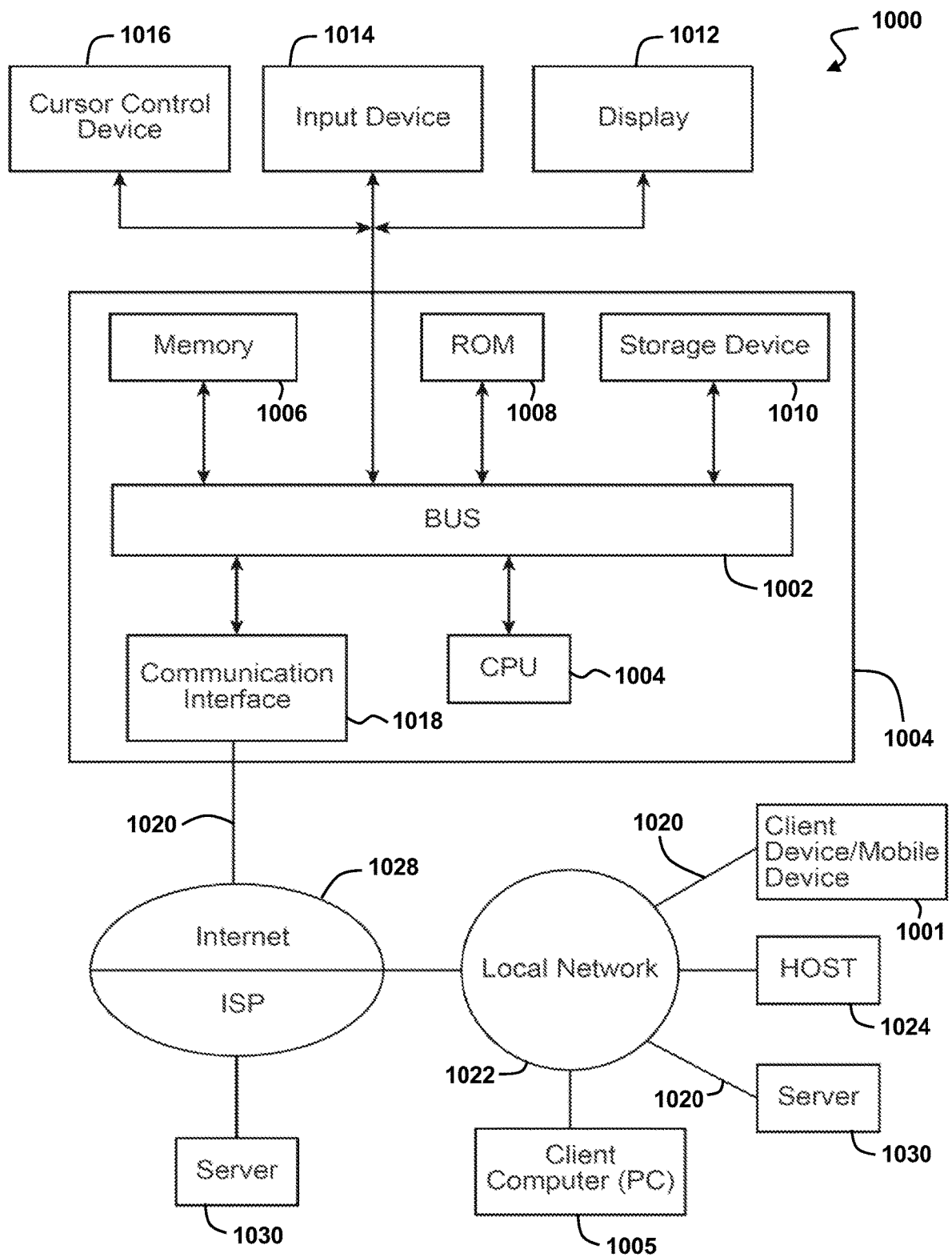
FIG. 17 shows a block diagram and process of an exemplary system in which an embodiment may be implemented.

FIG. 17 shows a block diagram of an example system 1000 in which an embodiment may be implemented. The system 1000 includes one or more client devices 1001 such as consumer electronics devices, connected to one or more server computing systems 1030. A server 1030 includes a bus 1002 or other communication mechanism for communicating information, and a processor (CPU) 1004 coupled with the bus 1002 for processing information. The server 1030 also includes a main memory 1006, such as a random access memory (RAM) or other dynamic storage device, coupled to the bus 1002 for storing information and instructions to be executed by the processor 1004. The main memory 1006 also may be used for storing temporary variables or other intermediate information during execution or instructions to be executed by the processor 1004. The server computer system 1030 further includes a read only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions. The bus 1002 may contain, for example, thirty-two address lines for addressing video memory or main memory 1006. The bus 1002 can also include, for example, a 32-bit data bus for transferring data between and among the components, such as the CPU 1004, the main memory 1006, video memory and the storage 1010. Alternatively, multiplex data/address lines may be used instead of separate data and address lines.

The server 1030 may be coupled via the bus 1002 to a display 1012 for displaying information to a computer user. An input device 1014, including alphanumeric and other keys, is coupled to the bus 1002 for communicating information and command selections to the processor 1004. Another type or user input device comprises cursor control 1016, such as a mouse, a trackball, or cursor direction keys for communicating direction information and command selections to the processor 1004 and for controlling cursor movement on the display 1012.

According to one embodiment, the functions are performed by the processor 1004 executing one or more sequences of one or more instructions contained in the main memory 1006. Such instructions may be read into the main memory 1006 from another computer-readable medium, such as the storage device 1010. Execution of the sequences of instructions contained in the main memory 1006 causes the processor 1004 to perform the process steps described herein. One or more processors in a multi-processing arrangement may also be employed to execute the sequences of instructions contained in the main memory 1006. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product" are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1004 for execution. Such a medium may take many forms, including but not limited to, non-volatile media, volatile media, and transmission media. Non-volatile media includes, for example, optical or magnetic disks, such as the storage device 1010. Volatile media includes dynamic memory, such as the main memory 1006. Transmission media includes coaxial cables, copper wire and fiber optics, including the wires that comprise the bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1004 for execution. For example, the instructions may initially be carried on a magnetic disk of a remote computer. The remote computer can load the instructions into its dynamic memory and send the instructions over a telephone line using a modem. A modem local to the server 1030 can receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1006, from which the processor 1004 retrieves and executes the instructions. The instructions received from the main memory 1006 may optionally be stored on the storage device 1010 either before or after execution by the processor 1004.

The server 1030 also includes a communication interface 1018 coupled to the bus 1002. The communication interface 1018 provides a two-way data communication coupling to a network link 1020 that is connected to the world wide packet data communication network now commonly referred to as the Internet 1028. The Internet 1028 uses electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

In another embodiment of the server 1030, interface 1018 is connected to a network 1022 via a communication link 1020. For example, the communication interface 1018 may be an integrated services digital network (ISDN) card or a modem to provide a data communication connection to a corresponding type of telephone line, which can comprise part of the network link 1020. As another example, the communication interface 1018 may be a local area network (LAN) card to provide a data communication connection to a compatible LAN. Wireless links may also be implemented. In any such implementation, the communication interface 1018 sends and receives electrical electromagnetic or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP). The ISP in turn provides data communication services through the Internet 1028. The local network 1022 and the Internet 1028 both use electrical, electromagnetic or optical signals that carry digital data streams. The signals through the various networks and the signals on the network link 1020 and through the communication interface 1018, which carry the digital data to and from the server 1030, are exemplary forms or carrier waves transporting the information.

The server 1030 can send/receive messages and data, including e-mail, program code, through the network, the network link 1020 and the communication interface 1018. Further, the communication interface 1018 can comprise a USB/Tuner and the network link 1020 may be an antenna or cable for connecting the server 1030 to a cable provider, satellite provider or other terrestrial transmission system for receiving messages, data and program code from another source.

The example versions of the embodiments described herein may be implemented as logical operations in a distributed processing system such as the system 1000 including the servers 1030. The logical operations of the embodiments may be implemented as a sequence of steps executing in the server 1030, and as interconnected machine modules within the system 1000. The implementation is a matter of choice and can depend on performance of the system 1000 implementing the embodiments. As such, the logical operations constituting said example versions of the embodiments are referred to for e.g., as operations, steps or modules.

Similar to a server 1030 described above, a client device 1001 can include a processor, memory, storage device, display, input device and communication interface (e.g., e-mail interface) for connecting the client device to the Internet 1028, the ISP, or LAN 1022, for communication with the servers 1030.

The system 1000 can further include computers (e.g., personal computers, computing nodes) 1005 operating in the same manner as client devices 1001, where a user can utilize one or more computers 1005 to manage data in the server 1030.

Figure 18:
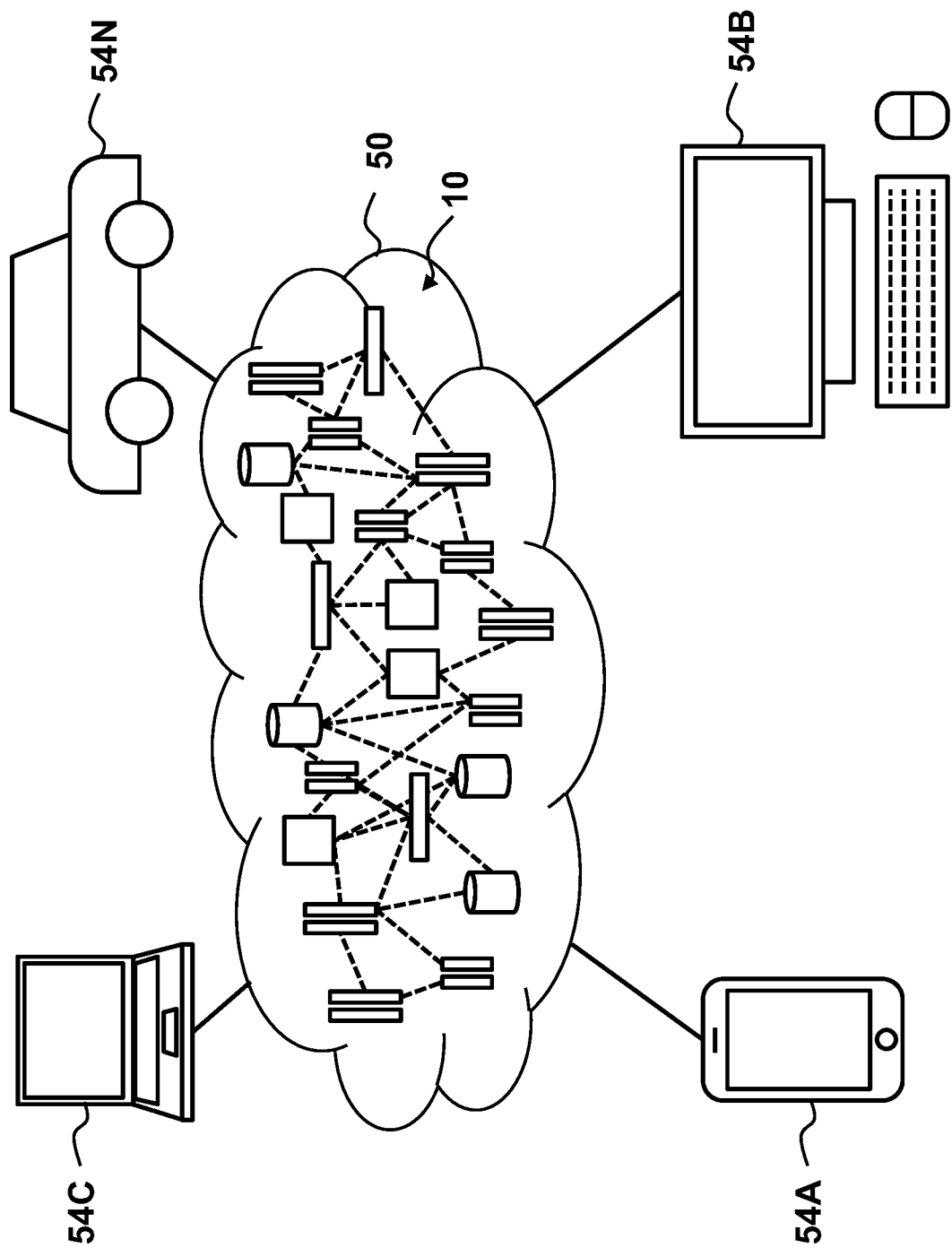
FIG. 18 depicts a cloud computing environment for implementing an embodiment of the system and process disclosed herein.

Referring now to FIG. 18, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
  an additive component;
  a subtractive component; and
  a processor and addressable memory, the processor configured to:
    receive a contact line associated with a support structure from the additive component;
    receive geometry associated with an orientation from the additive component;
    receive data associated with a tool from the subtractive component;
    generate a subtractive tool path based on the received contact line, the received data associated with the tool, and the received geometry;
    transmit the generated subtractive tool path to an analysis component for processing tool path validation; and validate, by the analysis component, the tool path based on output from a simulation component to determine whether removal of the support structure from a part is successfully computed by the subtractive component;

wherein if the analysis component determines that accessibility of the tool to the received contact line is lower than a predetermined level for the validated tool path, the subtractive component transmits this error to the additive component, and the additive component is configured to modify the support structure based on the error.

2. The system of claim 1, wherein the additive component comprises an additive manufacturing application and an additive kernel, and wherein the orientation comprises at least one of: data regarding a finished surface, removal accessibility of the support structure, deformation risk of the supported part, priority holes and priority surfaces, and support marks marking where the support structure contacts the supported part.

3. The system of claim 1, wherein construction of the support structure is finalized by iteratively adding and removing the received contact line based on receiving continuous and real-time or near real-time feedback from the subtractive component.

4. The system of claim 1, wherein the contact line specifies a set of points of contact between the support structure and the part.

5. The system of claim 1, wherein the subtractive manufacturing application is executed on a CNC machine.

6. The system of claim 1, wherein the support structure is removed by cutting along a contact line between the support structure and the part.

7. The system of claim 1, wherein the validation of the tool path is further based on accessibility of the contact line for cutting by the tool.

8. The system of claim 1, wherein the validation of the tool path is further based on collision avoidance of the tool while moving along the tool path.

9. A method comprising:
receiving, by a subtractive component, a contact line associated with a support structure from an additive component from an additive kernel;
receiving, by the subtractive component, geometry associated with orientation from the additive component;
generating, by the subtractive component, data associated with a tool;
determining, by the subtractive component, a subtractive tool path based on the received contact line, the received geometry, and the generated tool path;
transmitting, by the subtractive component, the determined subtractive tool path to an analysis component for processing tool path validation;
validating, by the analysis component, the tool path based on an output from a simulation component to determine whether removal of the support structure from a part is successfully computed by the subtractive component;
determining, by the analysis component, whether accessibility of the tool to the received contact line is lower than a predetermined level based on the tool path thereby indicating an error;
transmitting, by the subtractive component, the error to the additive component; and
modifying, by the additive component, the support structure based on the error indicating that the analysis component determined that accessibility of the tool to the received contact line is lower than a predetermined level for the validated tool path.

10. The method of claim 9, wherein the contact line is based on a region to support and a support structure, wherein the support structure information is based on support parameters and the region to support is based on geometry received from an additive component.

11. The method of claim 10, wherein the orientation is further based on output from the analysis component.

12. The method of claim 10, wherein the support parameters are based on output from the analysis component.

13. The method of claim 9, wherein the support structure is removed by cutting along a contact line between the support structure and the part.

14. The method of claim 9, wherein the validation of the tool path is further based on accessibility of the contact line for cutting by the tool.

15. The method of claim 9, wherein the validation of the tool path is further based on collision avoidance of the tool while moving along the tool path.

16. The method of claim 9 further comprising:
finalizing, by the additive component, construction of the support structure by iteratively adding and removing the received contact line based on receiving from the subtractive component continuous and real-time or near real-time feedback including any errors.

* * * * *